(12) United States Patent
Yano et al.

(10) Patent No.: US 7,378,149 B2
(45) Date of Patent: May 27, 2008

(54) HIGH STRENGTH MATERIAL USING CELLULOSE MICROFIBRILS

(75) Inventors: Hiroyuki Yano, Uji (JP); Susumu Nakahara, Osaka (JP)

(73) Assignee: Kansai Technology Licensing Organization Co, Ltd., Chudo Ji Awata-cho, Shinogoyo-Ku, Kyoto-Shi, Kyoto (JP)

( * ) Notice: Subject to any disclaimer, the term of this patent is extended or adjusted under 35 U.S.C. 154(b) by 0 days.

(21) Appl. No.: 10/499,420

(22) PCT Filed: Dec. 26, 2002

(86) PCT No.: PCT/JP02/13569

§ 371 (c)(1), (2), (4) Date: Jun. 18, 2004

(87) PCT Pub. No.: WO03/056103

PCT Pub. Date: Jul. 10, 2003

(65) Prior Publication Data

US 2005/0067730 A1 Mar. 31, 2005

(30) Foreign Application Priority Data

Dec. 26, 2001 (JP) .............................. 2001-394707

(51) Int. Cl.
B32B 23/00 (2006.01)
(52) U.S. Cl. .................. 428/393; 162/10; 162/100
(58) Field of Classification Search ............. 428/308.8, 428/17, 312.2, 312.4, 312.6, 319.7, 393; 162/10, 100
See application file for complete search history.

(56) References Cited

U.S. PATENT DOCUMENTS

| | | | | |
|---|---|---|---|---|
| 4,339,405 A | * | 7/1982 | Paszner | 264/108 |
| 4,374,702 A | * | 2/1983 | Turbak et al. | 162/100 |
| 4,742,164 A | * | 5/1988 | Iguchi et al. | 536/56 |
| 5,192,720 A | * | 3/1993 | Hida et al. | 501/98.1 |
| 5,582,682 A | * | 12/1996 | Ferretti | 162/10 |
| 6,083,582 A | * | 7/2000 | Chen et al. | 428/34.8 |
| 6,103,790 A | | 8/2000 | Cavaille et al. | |
| 6,117,545 A | * | 9/2000 | Cavaille et al. | 428/357 |
| 6,124,028 A | * | 9/2000 | Nagle et al. | 428/308.8 |
| 6,274,652 B1 | | 8/2001 | Uryu et al. | |
| 6,521,147 B1 | * | 2/2003 | Arentsen et al. | 264/45.3 |

FOREIGN PATENT DOCUMENTS

| | | |
|---|---|---|
| EP | 0 200 409 | 11/1986 |
| EP | 0 783 015 A1 | 7/1997 |
| JP | 61-113601 | 5/1986 |
| JP | 02-127486 | 5/1990 |
| JP | 05-247879 | 9/1993 |
| JP | 06-125593 | 5/1994 |
| JP | 06-311595 | 11/1994 |
| JP | 06-345944 | 12/1994 |
| JP | 08-49188 | 2/1996 |
| JP | 08-120593 | 5/1996 |
| JP | 08-188980 | 7/1996 |
| JP | 08-193168 | 7/1996 |
| JP | 08-197836 | 8/1996 |
| JP | 08-269888 | 10/1996 |
| JP | 09-208714 | 8/1997 |
| JP | 09-509694 | 9/1997 |
| JP | 09-302235 | 11/1997 |
| JP | 10-218245 | 8/1998 |
| JP | 10-245792 | 9/1998 |
| JP | 10-248872 | 9/1998 |
| JP | 2000-6142 | 1/2000 |
| JP | 2000-239440 | 9/2000 |
| JP | 2002-292608 | 10/2002 |

OTHER PUBLICATIONS

A. Boldizar, et al., "Prehydrolyzed Cellulose as Reinforcing Filler for Thermoplastics," Intern J. Polymeric Mater., vol. 11 (1987) pp. 229-262.
Taniguchi, et al., "New Films Produced from Microfibrillated Natural Fibres," Polymer International 47 (1998) pp. 291-294.
Franklin W. Herrick, et al., "Microfibrillated Cellulose: Morphology and Accessibility," J. App. Polym. Sci. Applied Polymer Symposium 37 (1983) pp. 797-813.
Yuji Matsuda, "Properties and Use of Microfibrillated Cellulose as Papermaking Additive," Fiber and Industry 56 (2000) pp. 192-196.
Hiroyuki Yano, et al., "Abstracts of the 52st Annual Meeting of the Japan Wood Research Society," Article J21615, Mar. 10, 2002.
"Abstracts of the 52st Annual Meeting of the Japan Wood Research Society," Article J21600, Mar. 10, 2002.
"The 6th Pacific Rim Bio-Based Composites Symposium & Workshop on The Chemical Modification of Cellulosics," pp. 171-176, Oct. 27, 2002.
"The 6th Pacific Rim Bio-Based Composites Symposium & Workshop on The Chemical Modification of Cellulosics," pp. 188-192, Oct. 27, 2002.
Yoshitaka Fukui, "Microfibrillated Cellulose," Kinoushikenkyuukaishi, No. 24, pp. 5-12 (1985).
"Preprints of 2002 Cellulose R&D 9th Annual Meeting of the Cellulose Society of Japan," Article K1, Jun. 25, 2002.

* cited by examiner

Primary Examiner—N. Edwards
(74) Attorney, Agent, or Firm—Knobbe, Martens, Olson & Bear LLP

(57) ABSTRACT

The present invention relates to a high strength material and a high strength molded article including 65 to 100 wt. % of cellulose microfibrils; and products comprising these. The material, which is lightweight and has a very high strength, can be used for various purposes and can be produced by recycling wastepaper, used cloth and the like. Furthermore, by appropriately selecting the type and/or amount of binder, the material comprising microfibrils as a main component can be decomposed by microbes or the like after being dumped as waste, and is thus friendly to the global environment.

20 Claims, No Drawings

HIGH STRENGTH MATERIAL USING CELLULOSE MICROFIBRILS

This application is the U.S. National Phase under 35 U.S.C. §371 of International Application PCT/JP02/13569, filed on Dec. 26, 2002, which claims priority of Japanese Patent Application No. 2001-394707, filed on Dec. 26, 2001. The International Application was published under PCT Article 21(2) in a language other than English.

TECHNICAL FIELD

The present invention relates to a composition for producing high strength materials and high strength molded articles comprising cellulose microfibrils; a high strength material and a high strength molded article produced using cellulose microfibrils; and processes for their production. The present invention further relates to products produced using the high strength material and/or the high strength molded article.

BACKGROUND ART

For a long time, molded articles have been produced by adding wood flour or pulp to a thermosetting resin. Recently, however, there has been growing concern over plastics and like waste problems, and decomposable plastics and biodegradable plastics have been developed. For example, Japanese Unexamined Patent Publication No. 1990-127486 discloses a biodegradable water-resistant coating comprising microfibrillated fibers and chitosan.

Strength is also required for various uses. For example, Japanese Unexamined Patent Publication No. 1996-193168 discloses a biodegradable polymer composition, and Japanese Unexamined Patent Publication No. 1997-509694 discloses a microfibril cellose reinforced polymer.

However, materials with sufficiently high strength have not yet been obtained.

An object of the invention is to provide a high strength material produced using cellulose microfibrils.

DISCLOSURE OF THE INVENTION

The present invention provides the following high strength materials produced using cellulose microfibrils, etc.

Item 1. A high strength material comprising 65 to 100 wt. % of cellulose microfibrils.

Item 2. A high strength material according to item 1 comprising 65 to 99 wt. % of cellulose microfibrils.

Item 3. A high strength material according to item 1 comprising a thermosetting resin or thermoplastic resin.

Item 4. A high strength material according to item 1 comprising starch.

Item 5. A high strength material according to item 1 having a porosity of 20% or less.

Item 6. A high strength material according to item 1 having a density of at least 1.1 g/cm$^3$.

Item 7. A high strength material according to item 1 having a strength of at least 200 MPa.

Item 8. A high strength material according to item 1 whose moisture content is 5% or less.

Item 9. A high strength molded article comprising 65 to 100 wt. % of cellulose microfibrils.

Item 10. A high strength molded article according to item 9 comprising 65 to 99 wt. % of cellulose microfibrils.

Item 11. A high strength molded article according to item 9 comprising a thermosetting resin or thermoplastic resin.

Item 12. A high strength molded article according to item 9 comprising starch.

Item 13. A high strength molded article according to item 9 having a porosity of 20% or less.

Item 14. A high strength molded article according to item 9 having a density of at least 1.1 g/cm$^3$.

Item 15. A high strength molded article according to item 9 having a strength of at least 200 MPa.

Item 16. A high strength molded article according to item 9 whose moisture content is 5% or less.

Item 17. A high strength product comprising the high strength material of item 1 and/or the high strength molded article of item 9.

Item 18. A composition for producing high strength materials or high strength molded articles comprising cellulose microfibrils.

Item 19. A composition for producing high strength materials or high strength molded articles according to item 18 which is an aqueous slurry containing cellulose microfibrils.

Item 20. A composition for producing high strength materials or high strength molded articles according to item 18, which is in the form of a sheet.

Item 21. A process for producing a high strength material comprising reducing the amount of the dispersion medium of the composition of item 18 and hot pressing the resulting composition.

Item 22. A process for producing a high strength molded article comprising reducing the amount of the dispersion medium of the composition of item 18 and hot pressing the resulting composition.

DETAILED DESCRIPTION OF THE INVENTION

The present invention will be described below in detail.

The cellulose microfibrils (hereinafter referred to as "microfibrils") used in the invention refer to microfibrillated cellulose fibers. The degree of microfibrillation can be evaluated, for example, using water retention as an indicator.

Water retention can be expressed, for example, by the moisture content (on a dry weight basis) after a 2% aqueous slurry of fiber (on a solid basis) is centrifuged at 1000 G for 15 minutes. The water retention of untreated pulp is about 100 to about 120%, for example. A water retention value of 150% corresponds to 400 to 500 ml Canadian Standard Freeness (F. W. Herrick, R. L. Casebier, J. K. Hamilton, K. R. Sandberg, *J. Appl. Polym. Sci.*: Applied Polymer Symposium, 37, 797-813 (1983)). The moisture content can be calculated, for example, by the formula $(W-W_o)/W_o$ (%), wherein $W_o$ is the weight of microfibrils dried at 105° C. until a constant weight is reached, and W is the weight after centrifuging.

The water retention of cellulose microfibrils used in the invention is about 200 to about 600%, preferably about 300 to about 600%, and more preferably about 400 to about 600%.

The kinds of microfibrils used in the invention are not particularly limited and examples include those derived from: acetic acid bacteria or like microorganisms; sea squirts and like animals; and wood, bamboo, hemp, jute, kenaf, farm wastes, cloth, wastepaper and like plant materials. Microfibrils derived from plant materials are preferable for reasons such as cost and ease of availability. With an eye to the global environment, it is preferable to recycle newspaper, magazines, corrugated board and like wastepaper, used clothing made of vegetable fibers and like cloth.

The microfibrils of the invention are not particularly limited and can be produced by known methods. Commercially available microfibrils are usable. The microfibrils can be prepared, for example, by forming pulp into fine fibers (F. W. Herrick, R. L. Casebier, J. K. Hamilton, K. R. Sandberg, J. Appl. Polym. Sci.: Applied Polymer Symposium, 37, 797-813(1983); Katsunori Fukui, Kinoushikenkyuukaishi (Bulletin of the High Performance Paper Society) No. 24, 5-12 (1985)); T. Taniguchi, K. Okamura, Polymer Int., 47 (3), 291-294 (1998); Yuji Matsuda, Fiber and Industry 56, 192-196 (2000)).

The method of forming pulp into microfibrils is not particularly limited and known methods are usable. Examples of usable methods include treatments using medium stirring mills, vibration mills, high-pressure homogenizers, stone mill grinding, and the like.

Pulps usable herein include, for example, chemical pulps obtained from wood by chemical treatment, such as kraft pulps, sulfite pulps and the like; semi-chemical pulps obtained by mechanical pulping treatments using refiners, grinders or the like; and recycled pulps produced from wastepaper. Among these, use of recycled pulp is preferable in view of costs and wastepaper recycling promotion.

Recycled pulp can be obtained from wastepapers such as newspaper, magazines and corrugated board according to commonly used recycled paper manufacturing processes. Wastepaper is first macerated by a pulper or the like, then subjected to roughing and cleaning with screens, cleaners or the like and deinked by a floatation method or the like, followed by dehydration. The methods used in these steps of the process can be suitably selected in accordance with the kind and quality of wastepaper.

The microfibrils used in the invention can be prepared, for example, by forming the pulp into fine fibers. The microfibrils of the invention include not only those obtained by the above method but also those obtained by subjecting pulp to various other treatments, for example, (1) etherification treatments by reaction with an epoxide, cyanoethylation reaction, reaction with an alkyl chloride, etc.; (2) acetalization treatments by formalization reaction, etc.; (3) esterification treatments by acetylation treatment, alkyl ketene dimer treatment, maleic anhydride glycerol treatment, etc.; (4) isocyanate treatments by reaction with isocyanates, etc.

Microfibrils obtained from wastepaper-derived recycled pulps may contain impurities. To provide a high strength material or molded article, the amount of impurities such as clays, ceramics, inks and the like contained is preferably not more than 20%.

The high strength material or high strength molded article of the invention comprises about 65 to about 100 wt. % of cellulose microfibrils, and preferably about 65 to about 99 wt. %. Materials and molded articles comprising 100 wt. % of microfibrils, i.e., consisting of microfibrils, are included in the scope of the invention.

Additives may be included in the balance, i.e., an amount from 0 to about 35 wt. %, and preferably about 1 to about 35 wt. %. Examples of usable additives include binders so as to increase strength, etc.; inorganic compounds such as ceramics to increase heat resistance; conductants such as metal powders, carbon nanotubes and the like to impart magnetism, conductivity, etc.; pigments, dyes, flow regulators, leveling agents, surfactants, antifoaming agents, antistatic agents; electromagnetic shields such as metals, carbon powders and the like for shielding electromagnetic waves; UV absorbers, dispersion agents, deodorizers; antimicrobial agents such as silver powders, titanium oxide and the like; etc. These additives can be used singly or in combination of two or more. The mixing ratio is not particularly limited and can be suitably selected according to the desired material or molded article.

When the high strength material or high strength molded article of the invention contains impurities derived from wastepaper or the like as described above, it is preferable that the total weight of impurities and additives be in the range of 0 to about 35 wt. %, and preferably about 1 to about 35 wt. %.

For example, when adding additives such as ceramics or like inorganic compounds; magnetic materials, metal powders, carbon nanotubes and like conductants; pigments, dyes, flow regulators, leveling agents, surfactants, antifoaming agents, antistatic agents; metals, carbon powders and like electromagnetic shields; UV absorbers, dispersion agents, deodorizers; silver powders, titanium oxide and like antimicrobial agents, etc., it is preferable to use a binder together with such additives as required, so that the additives can be dispersed in the composition for producing high strength materials or high strength molded articles containing microfibrils, and in the high strength materials or high strength molded articles.

Known organic polymers are usable as binders. Examples of such organic polymers include water-soluble polymers such as polyvinyl alcohols, polyethylene oxide, polyacrylamide, polyvinylpyrrolidone and like synthetic polymers; starches, alginic acid and like polysaccharides; natural polymers such as gelatin, hide glue, casein and like proteins; and thermoplastic resins, thermosetting resins and the like.

Examples of preferable binders include starches, thermoplastic resins, thermosetting resins and the like.

Usable starches are not particularly limited and include not only natural starches but also a starches, soluble starches, dextrin and like starches, and starch derivatives. For ease of processing, etc., soluble starches and the like are preferable. Starches can be used, for example, in an amount from 0 to about 35 wt. %, preferably 0 to about 20 wt. %, and more preferably 0 to about 10 wt. %.

Usable thermoplastic resins are not particularly limited and include vinyl chloride resins, vinyl acetate resins, polystyrenes, ABS resins, acrylic resins, polyethylenes, polyethylene terephthalates, polypropylenes, fluororesins, polyamide resins, acetal resins, polycarbonates, cellulose plastics; polylactic acid, polyglycolic acid, poly-3-hydroxybutylate, poly-4-hydroxybutylate, polyhydroxyvalerate, polyethyleneadipate, polycaprolactone, polypropiolactone and like polyesters; polyethylene glycol and like polyethers; polyglutamic acid, polylysine and like polyamides; polyvinyl alcohols, polyurethane, polybutylene succinate, polybutylene succinate adipate and the like.

Biodegradable resins such as polylactic acid, polyglycolic acid, polycaprolactone, polyvinyl alcohol, polybutylene succinate, polybutylene succinate adipate and the like are preferable in consideration of the global environment. These resins can be used singly or in combination of two or more.

The amount of thermoplastic resin is, for example, in the range of 0 to about 35 wt. %, and preferably about 1 to about 35 wt. %. When the amount of thermoplastic resin is within the above range, a high strength can be obtained.

Examples of usable thermosetting resins include phenolic resins, urea resins, melamine resins, unsaturated polyester resins, epoxy resins, diallyl phthalate resins, polyurethane resins, silicone resins, polyimide resins and the like. The amount of such thermosetting resin is, for example, in the range of 0 to about 35 wt. %, and preferably about 1 to about 35 wt. %. When the amount of thermosetting resin is within the above range, a high strength can be obtained.

Thermosetting resins, thermoplastic resins or starches can be used separately or a combination of thermosetting resin and starch or a combination of thermoplastic resin and starch can be used.

The obtained high strength material or high strength molded article has a porosity of, for example, about 20% or less, preferably about 10% or less, and more preferably about 5% or less. This is because when the porosity is about 20% or less, a sufficiently high strength is obtained.

A low moisture content is preferable for retaining the high strength of the obtained material or molded article. For example, when a thermoplastic resin or a thermosetting resin is used as an additive, the moisture content is preferably about 10% or less, and more preferably about 5% or less. When a starch is used as an additive, the moisture content is preferably about 5% or less, and more preferably about 3% or less.

The water volume is not included in the porosity calculation. For example, the sum of water volume % and porosity relative to the volume of the material or molded article of the invention (i.e., percentage volume of substances other than microfibrils and additives relative to the volume of the material or molded article of the invention) is preferably about 25% or less, and more preferably about 15% or less.

The density of the obtained material or molded article may vary with the density of additives used, etc. For example, when no additives (only microcibrils) are used, or starches, thermoplastic resins or thermosetting resins are used as additives, the obtained material or molded article has a density of, for example, about 1.1 $g/cm^3$ or more, preferably about 1.2 $g/cm^3$ or more, and particularly preferably about 1.35 $g/cm^3$ or more.

"Strength" as used herein refers to bending strength, and can be measured by known methods. For example, the strength can be measured at room temperature in an about 60% relative humidity atmosphere using a three-point bending test (JIS K 7171:1994: plastics—determination of flexural properties).

Any method that can produce a high strength microfibril material or molded article is usable to produce the material or the molded article of the invention. For example, the following methods can be used.

In one method, microfibril sheets can be produced by forming a microfibril suspension into paper. Usable dispersion media are not particularly limited so long as they do not reduce the strength of cellulose crystals. Preferable are water, ethylene glycol, methanol, ethanol and like alcohols.

The above microfibril suspension is referred to as "a composition for producing high strength materials or high strength molded articles". If necessary, the composition may contain additives as described above.

The method of forming the suspension into paper is not particularly limited and commonly used paper making methods are usable. In consideration of paper producibility, fluidity, conditions in which microfibrils do not flocculate, etc., the concentration of the suspension is about 0.01 to about 10 wt. %, preferably about 0.02 to about 5 wt. %, and particularly preferably about 0.1 to about 1 wt. %.

A single sheet or, if necessary, two or more laminated sheets of microfibrils produced by forming the suspension into paper are subjected to hot air drying, pressing or the like to reduce the amount of dispersion medium. When the amount of dispersion medium has been reduced, the sheets are hot pressed to give a high strength material of the invention. The sheets can be used not only in a laminate form but also folded or rolled.

When starch is used as an additive, examples of usable methods include the use of a microfibril suspension using a starch solution as a dispersion medium, immersion of single sheets or laminated sheets of microfibrils in a starch solution, etc.

The timing of starting hot pressing is not particularly limited so long as it is started after the reduction of the amount of dispersion medium enables easy handling and quick drying.

The hot pressing conditions can be suitably selected according to the desired material or molded article and other factors such as the thickness and size of the microfibril sheet and the kind and amount of additive. Preferable are conditions under which microfibrils do not deteriorate: for example, a pressure of about 0.01 to about 200 MPa, and preferably about 0.01 to about 80 MPa; and a temperature of about 20 to about 200° C., and preferably about 60 to about 180° C.

The duration of hot pressing is not particularly limited, and can be suitably selected according to the desired material or molded article. For example, it is performed for about 10 seconds to about 48 hours, preferably about 0.1 to about 24 hours, and more preferably about 0.1 to about 20 hours.

When hot pressing is performed while reducing the amount of dispersion medium, compression molding using dies made of moisture-permeable materials such as porous metals, porous ceramics and the like are preferable because of ease of molding into a desired shape.

Methods of producing a high strength material or high strength molded article of the invention without forming the microfibril suspension into paper include, for example, the following methods. In one method, when the amount of microfibril dispersion medium is partially reduced, the suspension is placed into a die, mold or the like that is made of a moisture-permeable material such as porous metal or porous ceramic. The amount of dispersion medium reduced at this stage is not particularly limited. Pressure is then applied as required to remove water. When the amount of dispersion medium has been reduced to a certain degree, hot pressing is performed as described above. By further repeating the removal of the dispersion medium and addition of the microfibril suspension as required, a molded article with a desired thickness can be obtained.

When materials or molded articles containing a thermoplastic resin as an additive are to be produced, a method comprising subjecting to hot molding a mixture of a thermoplastic resin and microfibrils with a sufficiently reduced amount of dispersion medium by filtration can be used. The resin to be added is not particularly limited in shape and may be added, for example, in the form of powders, particles or fibers. Heating temperatures are also not particularly limited and can be suitably selected according to the kind of resin used, etc.

A method comprising laminating the desired numbers of microfibril sheets obtained by papermaking and thermoplastic resin sheets and melting the laminated sheets is also usable. It is also possible to use a method comprising immersing laminated microfibril sheets in a thermoplastic resin solution.

When materials comprising a thermosetting resin as an additive are to be produced, a usable method comprises suspending microfibrils in, instead of water, an about 0.1 to about 60 wt. %, and preferably about 2 to about 20 wt. % thermosetting resin solution and forming the suspension into paper to form microfibril sheets.

A method comprising forming a microfibril suspension into paper, laminating the obtained microfibril sheets and immersing the laminated sheets into a thermosetting resin solution is also usable. The concentration of the thermosetting resin solution is not particularly limited and can be within the range of, for example, about 0.1 to about 60 wt. %, and preferably about 2 to about 20 wt. %. Nor is the immersion time particularly limited. The sheets can be immersed, for example, for about 1 second to about 10 days, preferably for about 10 seconds to about 1 day, and more preferably for about 1 minute to about 1 hour.

The high strength material or molded article of the invention is lightweight and has a high strength and thus can be used generally in place of metals, ceramics, plastics, etc. For example, the high strength material or molded article can find applications in the following products: the housings of home electronic goods such as personal computers, cellular phones, televisions, air conditioners, printers and the like; office equipment such as stationery and the like; furniture such as desks, chairs, tables, chests of drawers/wardrobes, dressing tables and the like; daily necessities such as tableware, chopsticks, cutting boards and like kitchen utensils; horticultural and agricultural materials; sports equipment; automobile dashboards and like interior decoration; airplane overhead compartments; structural members of transport equipment; and construction materials such as residential closet members, pillars, beams, sashes, and the like. When no conductants are used as additives, the resulting material or molded article is highly insulative and thus finds application in electrical, electronic and communication equipment.

BEST MODE FOR CARRYING OUT THE INVENTION

Examples are given below to illustrate the invention in more detail. However, the present invention is not limited to these examples.

EXAMPLE 1

Production of a Material Consisting of Microfibrils

A 2% pulp slurry obtained by dispersing craft pulp (NBKB) (product of Daishowa Paper Manufacturing Co., Ltd.) was preliminarily crushed by a refiner and then passed 14 times through a high-pressure homogenizer (F. W. Herrick, R. L. Casebier, J. K. Hamilton, K. R. Sandberg, J. Appl. Polym. Sci.: Applied Polymer Symposium, 37, 797-813 (1983)) to form microfibrils. The obtained microfibrils had a water retention of 450%. The microfibrils thus obtained were used in this and the following Examples.

An aqueous suspension of 10% solid content microfibrils was placed into a die with a porous metal plate underneath to remove water therefrom and molded into a microfibril sheet with a moisture content of approximately 100% and a thickness of about 3 mm. The sheet was dried at 70° C. for 24 hours to reduce the moisture content to 5% and then sandwiched between porous metal plates and hot pressed at 100 MPa at 150° C. for 30 minutes. After cooling, the sheet was removed.

The resulting material was 60 mm in length, 60 mm in width and 1.5 mm in thickness, and had a density of 1.45 g/cm$^3$, a moisture content of 2 to 3% and a bending strength of 200-250 MPa.

EXAMPLE 2

Production of a Material Comprising Microfibrils and Starch

To an aqueous suspension of 10% solid content microfibrils was added and mixed a 5% aqueous solution of soluble starch in an amount of 2% by weight of starch relative to the total dry weight of microfibrils. A sheet of microfibrils was prepared in a manner similar to Example 1 and dried. The resulting sheet was hot pressed at 20 MPa at 120° C. for 60 minutes.

The obtained material was 60 mm in length, 60 mm in width and 1.5 mm in thickness, and had a density of 1.45 g/cm$^3$, a moisture content of 2 to 3% and a bending strength of 280-320 MPa.

EXAMPLE 3

Production of a Material Comprising Microfibrils and a Thermoplastic Resin

An aqueous 0.1% microfibril suspension and an aqueous 0.1% suspension of 5 mm-long polylactic acid fibers were prepared separately and stirred well. The suspensions in a weight ratio of 5:2 were then fully mixed to form paper sheets. After drying, the sheets were dried and then laminated 30-fold and hot pressed in a circular die at 30 MPa at 170° C. for 10 minutes.

The obtained material had a diameter of 50 mm, a thickness of 1.3 mm, a density of 1.37 g/cm$^3$, a moisture content of 2 to 3% and a bending strength of 200-270 MPa.

EXAMPLE 4

Production of a Material Comprising Microfibrils and a Thermosetting Resin

Microfibril sheets obtained in a manner similar to Example 1 were laminated 35-fold and immersed in a 8% methanol solution of a phenolic resin with a molecular weight of about 3000. After removing methanol, the sheet was hot pressed in a circular die at 80 MPa at 160° C. for 30 minutes.

The obtained material had a phenolic resin content of 16%, a diameter of 50 mm, a thickness of 1.3 mm, a density of 1.42 g/cm$^3$, a moisture content of 2 to 3% and a strength of 350-400 MPa.

EXAMPLE 5

Production of a Material Comprising Microfibrils and a Thermosetting Resin

To an aqueous suspension of 10% solid content microfibrils was added and mixed a 10% methanol solution of a phenolic resin with a molecular weight of about 3000 in an amount of 20% by weight of the resin relative to the total dry weight (solid basis) of microfibrils. After drying (air-drying) to reduce the moisture content to about 200%, the mixture was further dried at 50° C. to a moisture content of 100% while being sandwiched horizontally between porous metal plates and compressed at a pressure of 0.01 MPa. The dried product was then hot pressed at a pressure of 0.1 MPa at 160° C. for 30 minutes. The obtained material was 50 mm in length, 50 mm in width and 1.5 mm in thickness, and had a density of 1.3 g/cm³, a moisture content of 2 to 3% and a bending strength of 220-250 MPa.

Table 1 shows the density, Young's modulus and strength of various materials for reference. Table 2 shows the materials obtained in Examples 1 to 4.

TABLE 1

| Material | Density (g/cm³) | Young's modulus (GPa) | Strength (MPa) |
|---|---|---|---|
| Wood | 0.5 | 10 | 100 |
| Glass | 2.2 | 75 | 50 |
| Phenolic resin (wood flour added) | 1.3 | 8 | 80 |
| Acrylic resin (methyl methacrylate) | 1.2 | 3 | 100 |
| Mild steel | 7.8 | 210 | 300 |
| Structural steel | 7.8 | 210 | 450 |
| Stainless steel | 7.8 | 210 | 1000 |
| Magnesium alloy | 1.8 | 45 | 200 |
| Aluminium alloy | 2.8 | 70 | 180-250 |
| Aluminium alloy (Extra super duralumin) | 2.8 | 75 | 500 |
| Titanium alloy | 4.4 | 110 | 1000 |
| Glass fiber | 2.5 | 75 | 2500 |
| Carbon fiber | 1.7 | 230 | 3000 |
| Aramid fiber | 1.4 | 130 | 2800 |
| GFRP (uniaxially oriented) | 2.0 | 40 | 1200 |
| CFRP (uniaxially oriented) | 1.7 | 140 | 1500 |
| High strength wood (uniaxially oriented) | 1.4 | 62 | 670 |

*GFRP stands for glass fiber reinforced plastic.
*CFRP stands for carbon fiber reinforced plastic.

TABLE 2

| Example | | Density (g/cm³) | Porosity (%) | Strength (MPa) |
|---|---|---|---|---|
| 1 | Microfibrils alone | 1.45 | 4.6 | 200-250 |
| 2 | Microfibrils (98%) Soluble starch (2%) | 1.45 | 4.6 | 280-320 |
| 3 | Microfibrils (70%) Polylactic acid (30%) | 1.37 | 3.5 | 200-220 |
| 4 | Microfibrils (84%) Phenolic resin (16%) | 1.42 | 4.4 | 350-400 |
| 5 | Microfibrils (80%) Phenolic resin (20%) | 1.33 | 4.8 | 220-250 |

INDUSTRIAL APPLICABILITY

The material of the invention is lightweight and has a remarkably high strength, equivalent to structural steel. Furthermore, the material of the invention can be prepared by utilizing wastepaper, used clothes and the like. In addition, by appropriately selecting the kind and amount of binder, the material of the invention comprising microfibrils as a main component can be decomposed by microorganisms, etc. after being dumped as waste and is thus friendly to the global environment.

The invention claimed is:

1. A high strength material comprising 70 to 100 wt. % of cellulose microfibrils derived from plant materials, wherein the high strength material has a bending strength of at least 200 MPa.

2. A high strength material according to claim 1 comprising 70 to 99 wt. % of cellulose microfibrils.

3. A high strength material according to claim 1 comprising a thermosetting resin or thermoplastic resin.

4. A high strength material according to claim 1 comprising starch.

5. A high strength material according to claim 1 having a porosity of 20% or less.

6. A high strength material according to claim 1 having a density of at least 1.1 g/cm³.

7. A high strength material according to claim 1 whose moisture content is 5% or less.

8. A high strength molded article comprising 70 to 100 wt. % of cellulose microfibrils derived from plant material, wherein the high strength molded article has a bending strength of at least 200 MPa.

9. A high strength molded article according to claim 8 comprising 70 to 99 wt. % of cellulose microfibrils.

10. A high strength molded article according to claim 8 comprising a thermosetting resin or thermoplastic resin.

11. A high strength molded article according to claim 8 comprising starch.

12. A high strength molded article according to claim 8 having a porosity of 20% or less.

13. A high strength molded article according to claim 8 having a density of at least 1.1 g/cm³.

14. A high strength molded article according to claim 8 whose moisture content is 5% or less.

15. A high strength product comprising the high strength material of claim 1 or the high strength molded article of claim 8.

16. A process for producing the high strength material of claim 1 from a composition containing cellulose microfibrils derived from plant materials in a dispersion medium, the process comprising reducing the amount of the dispersion medium and hot pressing the resulting composition.

17. A process for producing the high strength molded article of claim 8 from a composition containing cellulose microfibrils derived from plant materials in a dispersion medium, the process comprising reducing the amount of the dispersion medium and hot pressing the resulting composition.

18. The high strength material of claim 1, formed by hot pressing.

19. The high strength material of claim 1, prepared by forming pulp into fine fibers without subjecting the pulp to other treatments.

20. The high strength molded article of claim 8, prepared by forming pulp into fine fibers without subjecting the pulp to other treatments.

* * * * *

UNITED STATES PATENT AND TRADEMARK OFFICE
CERTIFICATE OF CORRECTION

PATENT NO. : 7,378,149 B2 Page 1 of 1
APPLICATION NO. : 10/499420
DATED : May 27, 2008
INVENTOR(S) : Yano et al.

It is certified that error appears in the above-identified patent and that said Letters Patent is hereby corrected as shown below:

On the Title page, left column after "(73) Assignee:" please delete "Kansai Technology Licensing Organization Co, Ltd., Chudo Jiu Awata-cho, Shinogoyo-Ku, Kyoto-Shi, Kyoto (JP)" and insert therefore: --KANSAI TECHNOLOGY LICENSING ORGANIZATION CO., LTD., 93, Chudoji Awata-cho, Shimogyo-ku, Kyoto-shi, Kyoto 600-8815, Japan--.

Signed and Sealed this

Eleventh Day of November, 2008

JON W. DUDAS
*Director of the United States Patent and Trademark Office*